F. TEICHMAN.
BALANCED VALVE.
APPLICATION FILED JULY 6, 1918.
1,305,026.
Patented May 27, 1919.
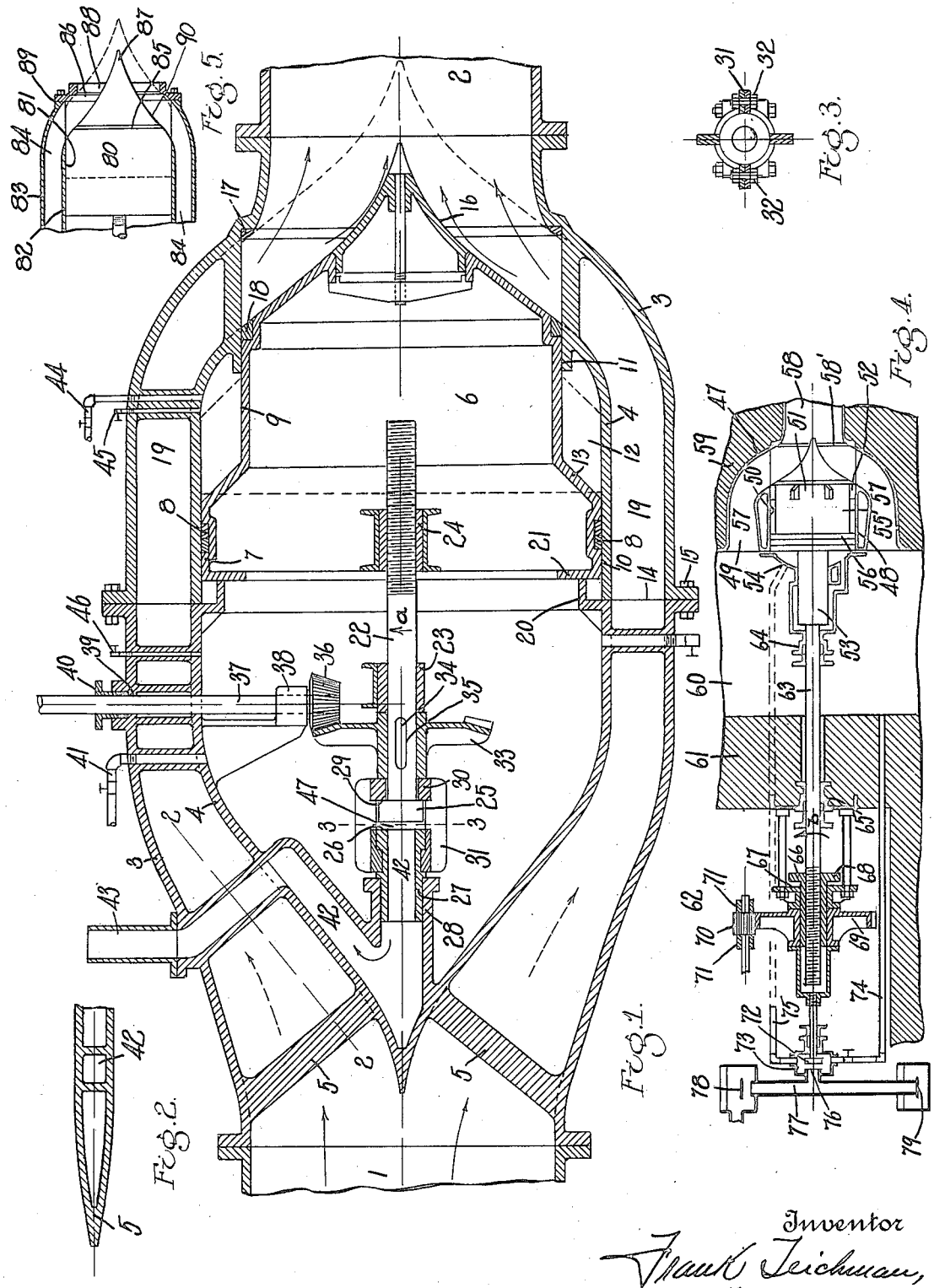
Inventor
Frank Teichman,
Charles N. Goodwin
Attorney

UNITED STATES PATENT OFFICE.

FRANK TEICHMAN, OF WOLLASTON, MASSACHUSETTS.

BALANCED VALVE.

1,305,026.           Specification of Letters Patent.     Patented May 27, 1919.

Application filed July 6, 1918. Serial No. 243,690.

*To all whom it may concern:*

Be it known that I, FRANK TEICHMAN, a citizen of the United States, residing at Wollaston, in the county of Norfolk and State of Massachusetts, have invented new and useful Improvements in Balanced Valves, of which the following is a specification.

This invention relates to improvements in balanced valves and particularly balanced valves of large sizes and under large fluid pressures that will, for any opening, discharge a circular jet. Such valves are, for instance, the valves that control the outlet from reservoirs.

The object of the invention is to provide a valve consisting of an outer shell and an inner top-shaped body disposed substantially coaxial with said outer shell and forming a fluid conduit between the outer shell and the top-shaped body, the movable valve member for the control of the passage of fluid being arranged to reciprocate within and be guided by said top-shaped body and being provided with mechanical instrumentalities for its positive operation, together with hydraulic instrumentalities rendered operative by the movements of said mechanical instrumentalities, the hydraulic operative forces coming into action to move said valve member, as a rule, prior to the mechanical operative forces.

The hydraulic instrumentalities are capable of producing either the excess of force in one or the other direction that is required for the movement of the movable valve member or the equilibrium of forces that is required to hold the movable valve member in any desired position, regardless of the pressure or velocity of the fluid passing through said valve member and for any position of the movable valve member between its fully opened and fully closed positions so that the movable valve member will be placed and held in any desired position by the hydraulic instrumentalities, the mechanical instrumentalities being, as a rule, merely the means for bringing about the hydraulic operative action but being at all times ready to assist or enforce mechanically the desired movement or the stability of the movable valve member.

The result of this arrangement is a reduction to a minimum of the load upon and of the wear in said mechanism and of the energy required for the operation of the valve so that, as a rule, manual power will suffice for this operation.

The invention consists in the combination and arrangement of parts set forth in the following specification and particularly pointed out in the claims.

Referring to the drawings:

Figure 1 is a vertical longitudinal section of the valve embodying my invention.

Fig. 2 is a detail section of one of the ribs which maintains the inner top-shaped body in coaxial relation to the outer shell, said section being taken on the line 2—2 of Fig. 1.

Fig. 3 is a detail transverse section taken on the line 3—3 of Fig. 1.

Fig. 4 is a vertical longitudinal section showing a modified form of valve.

Fig. 5 is a vertical longitudinal section through a portion of another modification of the valve embodying my invention.

Like numerals refer to like parts throughout the several views of the drawings.

In the drawings, referring particularly to Figs. 1, 2 and 3, 1 is the upper end and 2 the lower end of a conduit, between which is arranged one form of valve embodying my invention, this being one of the many ways in which the valve may be employed. The valve embodying this invention consists of a housing having an outer enlarged shell 3 and a hollow inner top-shaped body 4 disposed substantially coaxial with said outer shell, said inner top-shaped body 4 being supported in its coaxial relation with said outer shell 3 by a plurality of longitudinal ribs 5, thin and tapered at their upstream ends, the passages formed by said outer shell 3, said body 4 and said ribs 5 constituting fluid conduits 19 so curved as to have a minimum loss in friction and eddy action and so dimensioned that the aggregate area of said passages diminishes downstream toward the downstream end 2 of said conduits. The hollow body 4 holds within its downstream end the movable valve member 6, sometimes known as the needle or plug. The movable valve member embodies a cylinder 7 of relatively large diameter, preferably provided with packing or cylinder rings 8 and a cylinder 9 of smaller diameter, these cylinders being guided by the cylindrical bore of the inner body 4 at 10 and 11 respectively.

The downstream end of the ribs 5 terminate in alinement with the inner cylindrical surface 11 and thus form the extended guides for the smaller cylinder 9.

The fit of the two cylinders 7 and 9 inside of the cylinders 10 and 11 need not be tight, but the fit of the larger cylinder should be tighter than that of the smaller cylinder so that the pressure of the fluid entering by leakage around the smaller cylinder into the annular space 12 surrounding the valve member will not be largely lost by leakage around the larger cylinder but will operate against a shoulder 13 formed upon said movable valve member between the large and small cylindrical portions thereof.

In the open position of the valve, the downstream face 16 of the movable valve member forms a continuation of the surface of the top-shaped body and an annular flange 20 of the top-shaped body is in contact with an annular rib 21 of the movable valve member and to the extent that this contact forms a water-tight seal, leakage around the movable valve member will be prevented.

In the closed position of the valve, the downstream face 16 of the valve member occupies the position indicated in Fig. 1 in dotted lines and the closure of the valve, i. e., of the conduits 19, will be effected by the contact of a seat ring 17 of the shell 3 with the face of a seat ring 18 which forms part of the movable valve member. The outer shell 3 and the inner top-shaped body 4 are formed in two parts joined in a transverse plane at 14 and held together by bolts 15.

Within the top-shaped body 4 is a screw shaft 22 journaled coaxially with the movable valve member in a bearing 23 supported from the walls of the body 4, one end of the screw shaft having threaded engagement with a nut 24 carried by the movable valve member, the other end having a collar 25 constituting an auxiliary valve and arranged to provide limited axial play between the finished face 26 of a bushing 27 rigidly secured within a boss 28 formed within said body 4 and the finished face 29 of a ring 30, which is shown as made in halves and as fastened by a clamp 31 to said bushing, preferably by bolts 32.

Upon the screw shaft 22 and fitting in between said bearing 23 and said ring 30 is loosely arranged a gear 33 operatively connected with said screw shaft, in the present illustration by a feather 34, which loosely fits a keyway 35 of the hub of the gear. The gear 33 is rotated from the outside of the shell 3 by means of a pinion 36 and its shaft 37 journaled to rotate in suitable bearings 38 and 39 and made water-tight at the shell by a suitable stuffing box 40.

Any rotation of the gear mechanism and thereby of the screw shaft will result first in axial motion of the screw shaft in one or the other direction, depending on the hand of the thread and the direction of the rotating motion, the axial movement of the screw shaft continuing until the auxiliary valve 25 comes in contact either with the face 26 or face 29. After that, further rotation of the screw shaft will move the movable valve member axially and in a direction opposite to that of the first mentioned axial movement of said screw shaft 22.

The interior of the top-shaped body 4 may be connected, by a pipe 41, with the conduit 1 or directly with the source from which said conduit receives its supply. The bushing 27 provides a passage 42 that continues through one of the ribs 5 and terminates in a short stand pipe 43, the passage from the bushing 27 out through the stand pipe constituting a release conduit. The area of the release is such that the amount of pressure fluid furnished through the pipe 41 plus the pressure fluid leaking around the movable valve member into the top-shaped body can be discharged through the release conduit when wide open with such small resistance as to be negligible.

For the position of the mechanism as shown in Fig. 1 and for fluid passing through the conduits 19 in the direction of the arrows, the movable valve member will be held in its position first mechanically by the screw shaft, then hydraulically by the excess of the upstream action—called reaction—of the discharging fluid upon the face 16 of the movable valve member and of the upstream pressure against the shoulder 13 of the annular space 12 over and above the downstream pressure inside the top-shaped body against the movable valve member, which downstream pressure is, with the release conduit fully opened, only that of the stand pipe 43.

In case the jet discharges into a conduit 2, the reaction may, in part, be balanced by the action of a partial vacuum established by the fluid jet as it issues into said conduit 2.

The general operation of the valve hereinbefore described is as follows:

Assuming that the screw shaft 22 has a right hand thread and that a rotary motion is imparted thereto in the direction of the arrow *a* by the rotating instrumentalities hereinbefore described, the mechanical result will be to close the release conduit and then force the needle toward the closure, as hereinbefore stated, but before the release conduit is closed or the auxiliary valve 25 has come into contact with the face 26 of the bushing 27, the continuous ingress of pressure fluid through the pipe 41 and by leakage will have raised the pressure of the movable valve member enough to move said member downstream toward the closure, increasing thereby the play 47 between the auxiliary valve 25 and the face 26 and again lowering the pressure inside of the top-shaped body.

A renewal of the rotary motion of the screw shaft is followed by a repetition of the downstream movement of the movable valve member, etc., so that the closing motion to the movable valve member will be executed, not by the mechanical but the hydraulic instrumentalities, namely, the excess of the force due to the pressure back of the movable valve member over the other forces acting upon this member, inclusive of the friction of the movable valve member.

Continued turning of the screw shaft 22 will produce a continued movement of the movable valve member until it has reached the closed position, the hydraulic forces always acting in advance of the mechanical forces, the latter coming into action only when the former forces are insufficient to move the valve member, and this takes place without any special attention on the part of the operator.

When the seating of the valve member is accomplished by contact of the seat rings 17 and 18, the operator will, without intent, continue the rotation of the screw shaft until the auxiliary valve 25 is up against the face 26 of the bushing 27. This will prevent further outlet through the release conduit and this stops further inlet through the pipe 41 and further leakage around the valve member, and the movable valve member is pressed against its seat with a force proportional to the head of the source of supply of fluid and to the area of the circular line of contact of the seat ring 17 and seat ring 18.

To open the valve, the operation is reversed, that is to say, the screw shaft 22 is turned by means of the gear mechanism in a direction opposite to that indicated by the arrow a, whereupon the initial rotary movement imparted to said screw shaft will cause the auxiliary valve 25 to leave its seat against the bushing 27, thus opening the release conduit and thereby reducing the fluid pressure within the valve body 4 eventually to that of the stand pipe 43.

Opposed to the downstream force, due to this pressure, is the upstream force, due to the pressure in the annular space 12 against the shoulder 13 of the movable valve member, the pressure being that of the source of supply, the pressure fluid being furnished by leakage around the small cylinder 9 of the movable valve member. In case this leakage is insufficient for the desirable rate of motion of the movable valve member, a pipe connection 44 may be opened and kept open at all times, which pipe connection takes the fluid from the same source as the pipe connection 41. The movable valve member will raise from its seat as soon as said upstream force of the annular space 12 becomes greater than the friction and said downstream force on the back of the movable valve member, this latter force diminishing with the turning of the mechanism.

First, the axial motion of the movable valve member will reduce again the clearance 47 between the auxiliary valve 25 and the face 26 of the release conduit, and as a consequence, the pressure will increase and further axial motion of the movable valve member will cease until the rotation of the screw shaft is repeated. In this manner, a continued rotation of the screw shaft will bring about a continued opening of the valve member until it attains its wide open position, when the operator will continue, without intent, the rotary motion until the auxiliary valve 25 is home against the ring 30 and the release conduit wide open and the movable valve member mechanically locked in its position.

The operator may then close the connection 41 in case the valve is to remain open for a long time. The pipe connection 46, shown in Fig. 1, serves the purpose of letting air out from the interior of the top-shaped body. The pipe connection 45 serves a similar purpose and may also be made use of in case there is difficulty in closing the wide open valve. By opening connection 45 and closing connection 44, the upstream pressure against the shoulder 13 will be reduced.

What has been said about the ever present aid of the mechanical forces to assist or enforce the valve motion holds good for the opening of the valve as well as for the closing thereof, and for a well designed valve the energy required for its operation is merely that of turning the gears and the screw shaft without any load being placed upon these parts.

In Fig. 4 I have illustrated a modified form of valve which will accomplish the same result as the form hereinbefore described. In this form, the outer shell 47 embodies only the downstream part of the shell shown in Fig. 1. Disposed substantially in coaxial relation to said outer shell 47 is an inner cylindrical valve body 48 supported within said outer shell by a plurality of longitudinal ribs 49, the inner valve body 48 and the ribs 49 terminating upstream flush with the upstream end of the outer shell 47, while the downstream ends of said ribs terminate in alinement with the inner cylindrical face 50 of the inner valve body 48 to form guides for the movable valve member 51 by means of gliding shoes 52 attached to the movable valve body 51, one shoe for each of the ribs 49. The other guide for the movable valve member is formed by a cylindrical extension 53 fitting the bore of a head 54 which closes the upstream end of the inner valve body.

The annular space between the hollow cylindrical face 50 and the contracted part 55 of the movable valve member corresponds with the annular space 12 of Fig. 1, while the enlarged cylindrical face 56 of the movable valve member holds the packing or piston ring which glides on the inner cylindrical face 50 and forms a seal between said annular space and the space back of the movable valve member.

The space between the outer shell 47 and the inner body 48 is divided by the ribs 49 into a number of conduits 57 which, by the pointed downstream end of the movable valve member, are directed into the common cylindrical conduit 58. This carries, at its entrance, the seat ring 58' on which the movable valve member makes the closure when this member is in the extreme downstream position. The valve is placed in the face of a wall 59 which represents one side of a vertical conduit or well 60 suitably connected with the source of supply of fluid, the face of the wall 61 representing the opposite side of said conduit or well. On the other side of the wall 61 lies the operating compartment 62.

A screw shaft 63 is rigidly attached to the cylindrical extension 53 and carried through the stuffing boxes 64 and 65 into the operating compartment 62. The movable valve member is arranged to be reciprocated within the cylindrical valve body 48 by mechanical instrumentalities including a nut 66 having screw threaded engagement with the screw threaded shaft 63 and rotatably arranged within a rigidly supported bearing member 67. At one end the nut 66 has a collar 68 adapted to engage one face of the bearing member 67, and at the other end the nut carries, securely fastened thereto, a gear 69, said gear and said collar being positioned relatively to each other so as to allow a limited axial movement of the nut relatively to the stationary bearing member 67.

With the gear 69 meshes a pinion 70 journaled to rotate between bearings 71, 71 driven by manually operated means or by power. A limited axial movement of the nut 66 is imparted to a disk 72, due to its connection with the gear 69. The disk 72 is arranged within a small chamber 73 which has communication either with the conduit or well 60 or with any other suitable conduit, by means of a pipe 74, and it further has communication with the space between the head 54 and the movable valve member by means of a pipe 75. The disk 72 constitutes an auxiliary valve which moves with the nut 66 toward or away from the end of the mouth 76 of a release conduit 77.

The release conduit 77 operates either in the same manner as the release with stand pipe of Fig. 1, provided the upper end of the release conduit is open, as shown, or the release conduit 77 may have the upper end closed by a disk 78 and the lower end submerged and open by removal of the disk 79, in which case the pressure back of the movable valve member may be reduced below the atmosphere, a condition that may be desirable when the movable valve member is to be raised from its seat while the fluid pressure of the source is not great.

This mechanism will work exactly in the same manner as that of Fig. 1 because here, in the same manner as there, the turning of the mechanism will first impart a limited axial motion to the auxiliary valve 72, affecting the hydraulic conditions, and then impart an axial motion to the movable valve member, the direction of the second motion being in opposition to that of the first motion.

Fig. 5 shows still another modification of the invention. In this figure, a movable valve member 80 is shown as having a cylindrical body 81 of uniform diameter, which is arranged to reciprocate within the inner valve body 82, said valve body being mounted coaxially within the outer shell 83 in substantially the same manner as are the inner valve bodies of the forms hereinbefore described.

Ribs 84 are employed in this form to serve as continuations of the guiding surface of the inner valve body 82, whereby said movable valve member will be guided throughout its movement or until the ring 85, adjacent the downstream end thereof, is brought into contact with the seat ring 86 in the outer shell. The downstream end of the movable valve member 80 has a needle 87 similar to the needles of the valve members described.

In this form, the outer shell 83 is not, at its downstream end, connected with a conduit, but is provided with an opening 88 through which the fluid passing through the conduit of said valve will be discharged into the atmosphere in a circular jet. The downstream end of the outer shell 83 is made detachable at 89 so as to allow the movable valve member to be inserted or removed from the inner valve body.

The instrumentalities for operating the valve illustrated in Fig. 5 are substantially like those illustrated and described in connection with Fig. 1, with the exception that the upstream forces acting against the movable valve member 80 are confined wholly to the lower end 90 of said movable valve member, as the shoulders employed in the other forms of valve have been eliminated.

Having thus specifically described my invention, what I claim and desire by Letters Patent to secure is:

1. A valve having, in combination, a valve housing provided with a fluid conduit, a movable valve member arranged in said valve housing, a screw operatively connected with said movable valve member, means for imparting a rotary movement to said screw to move said movable valve member, means for allowing a limited axial movement of said screw during the initial movements of said screw rotating means in either direction, and hydraulic means rendered operative by the axial movements of said screw, adapted to automatically regulate the force acting independently of said screw upon said movable valve member to move said movable valve member to and hold the same in a predetermined position.

2. A valve having, in combination, an outer shell, a hollow inner valve body arranged in substantially coaxial relation with said outer shell and forming a fluid conduit, a movable valve member arranged to be reciprocated in said inner valve body to regulate the flow of fluid through said conduit, a screw connected with said movable valve member, means for imparting movement to said screw to positively operate said valve member in either direction, means for allowing a limited movement of said screw moving means longitudinally of said screw during the initial movements of said screw moving means in either direction, means for supplying fluid under pressure to the interior of said inner valve body, a valve adapted to regulate the release of said fluid from said inner valve body, and means operatively connecting said valve with said screw moving means adapted to operate said valve during the initial movements of said moving means.

3. A valve having in combination, an outer shell, an inner valve body arranged to coöperate with said outer shell to form a fluid conduit, a movable valve member arranged to be reciprocated in said inner valve body to regulate the flow of fluid through said conduit, a pipe connected with said inner valve body adapted to supply fluid under pressure thereto to exert a downstream force against said movable valve member, a release conduit for said inner valve body, an auxiliary valve for the discharge of fluid through said release conduit and a screw connected to said valve and coaxially arranged relatively to said valve body for regulating the discharge of fluid through said release conduit to increase or diminish said downstream force acting against said movable valve member.

4. A valve having in combination, an outer shell, an inner valve body arranged to coöperate with said outer shell to form a fluid conduit, a movable valve member arranged to be reciprocated in said inner valve body to regulate the flow of fluid through said conduit, a shoulder formed upon said movable valve member adapted to receive an upstream thrust from the fluid in said conduit, a pipe for supplying fluid under pressure to the interior of said inner valve body to exert a downstream force against said movable valve member in opposition to said upstream thrust acting against said shoulder, a release conduit connected with the interior of said inner valve body, an auxiliary valve adapted to regulate the discharge of fluid through said release conduit and a screw connected to said auxiliary valve and coaxially arranged relatively to said valve body whereby said discharge is regulated in such manner that the opposing forces acting against said movable valve member may be manipulated to effect the opening and closing of said valve.

5. A valve having in combination, an outer shell, an inner valve body arranged to coöperate with said outer shell to form a fluid conduit, a movable valve member arranged to be reciprocated in said inner valve body to regulate the flow of fluid through said conduit, said movable valve member constructed and arranged to receive a thrust from the fluid in said conduit, a screw connected with said movable valve member within said inner valve body, gears arranged within said inner valve body adapted to impart an axial movement to said screw and a valve movable with said screw adapted to control the release of fluid from said inner valve body whereby the pressure of fluid operating against said movable valve member within said inner valve body may be increased or diminished, relatively to the force exerted by the fluid in said conduit, to effect the opening and closing of said valve.

In testimony whereof I have hereunto set my hand in presence of two subscribing witnesses.

FRANK TEICHMAN.

Witnesses:
CHARLES S. GOODING,
SYDNEY E. TAFT.